F. R. HOYT.
MAGNETO.
APPLICATION FILED FEB. 15, 1916.
1,222,869.
Patented Apr. 17, 1917.
4 SHEETS—SHEET 1.
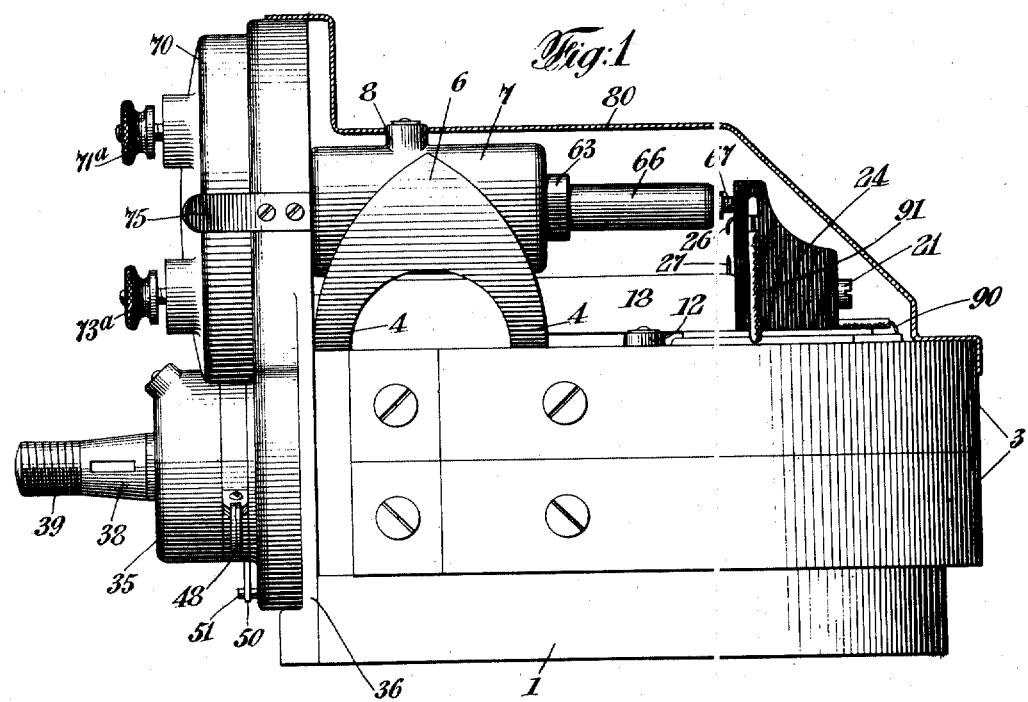
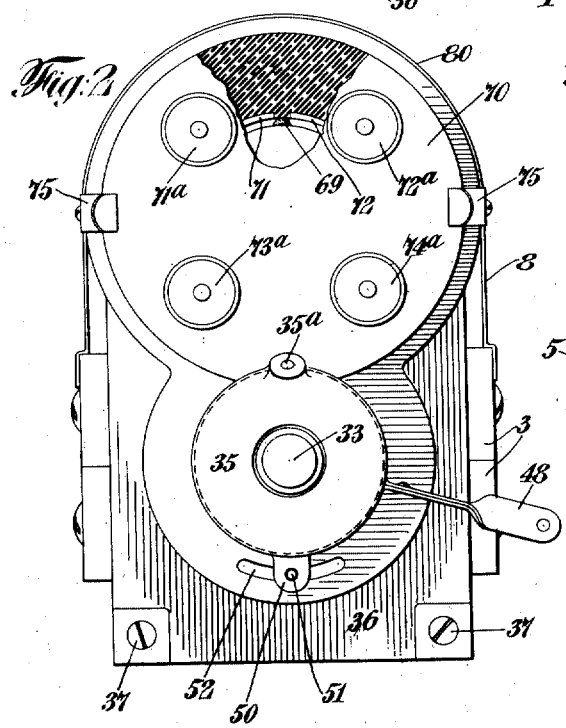
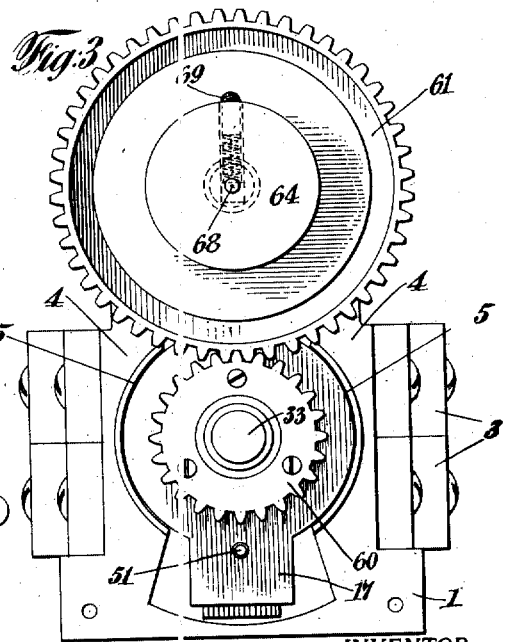
INVENTOR
Francis R. Hoyt
Whitaker Prevost
ATTORNEYS

F. R. HOYT.
MAGNETO.
APPLICATION FILED FEB. 15, 1916.

1,222,869.

Patented Apr. 17, 1917.
4 SHEETS—SHEET 2.

INVENTOR
Francis R. Hoyt
BY
Whitaker & Prevost
ATTORNEYS

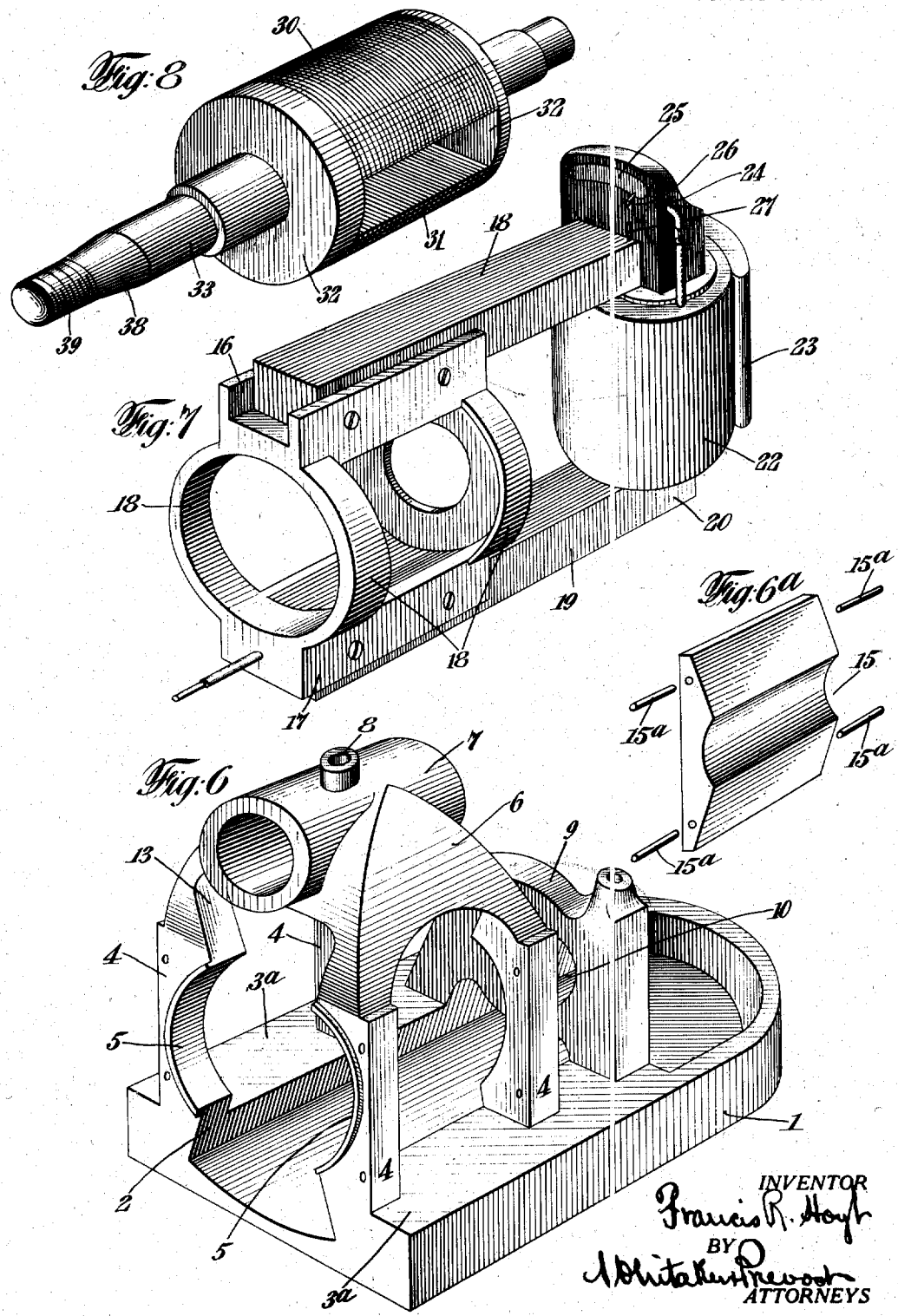

F. R. HOYT.
MAGNETO.
APPLICATION FILED FEB. 15, 1916.

1,222,869.

Patented Apr. 17, 1917.
4 SHEETS—SHEET 4.

INVENTOR
Francis R. Hoyt
BY
ATTORNEYS

UNITED STATES PATENT OFFICE.

FRANCIS R. HOYT, OF EAST ORANGE, NEW JERSEY, ASSIGNOR TO THE SIMMS MAGNETO COMPANY, OF EAST ORANGE, NEW JERSEY, A CORPORATION OF NEW YORK.

MAGNETO.

1,222,869.  Specification of Letters Patent.  Patented Apr. 17, 1917.

Application filed February 15, 1916. Serial No. 78,345.

*To all whom it may concern:*

Be it known that I, FRANCIS R. HOYT, a citizen of the United States, residing at East Orange, in the county of Essex and State of New Jersey, have invented certain new and useful Improvements in Magnetos; and I do hereby declare the following to be a full, clear, and exact description of the invention, such as will enable others skilled in the art to which it appertains to make and use the same.

My invention consists in the novel features hereinafter described reference being had to the accompanying drawings which show one embodiment of my invention selected by me for purposes of illustration, and said invention is fully disclosed in the following description and claims.

In the said drawings:

Figure 1 is a side elevation of an ignition magneto embodying my invention, the exterior inclosing casing being indicated in section in order to show the parts within.

Fig. 2 is a front elevation of the magneto.

Fig. 3 is a similar elevation with the front plate of the machine removed.

Fig. 6 is a perspective view of the main frame of the magneto with the field magnets and working parts removed.

Fig. 6ª is a detail of one of the magnet pole shoes.

Fig. 7 is a detail perspective view of the generating coil, its core, and the cradle structure, whereby it is supported so that it may be oscillated in the main frame about its axis.

Fig. 8 is a detail perspective view of the rotary magnetic reversing device showing the separated portions of magnetic material.

Figure 4:
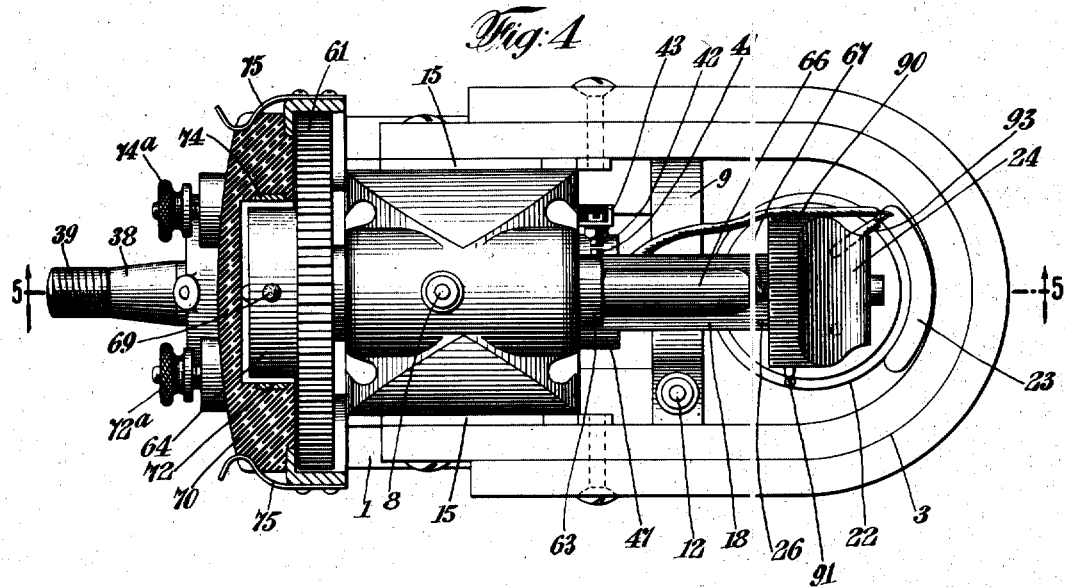
Fig. 4 is a top plan view of the machine with the inclosing casing removed and the front plate being shown in section.
Figure 5:
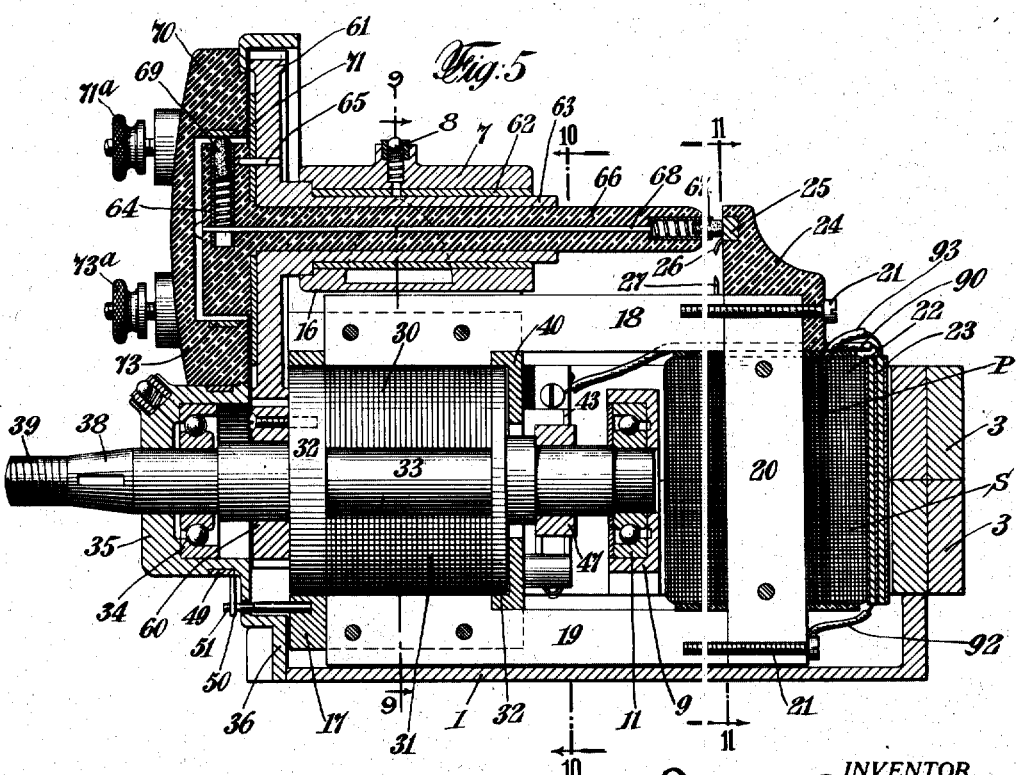
Fig. 5 is a vertical longitudinal section taken on the line 5—5 of Fig. 4.
Figure 9:
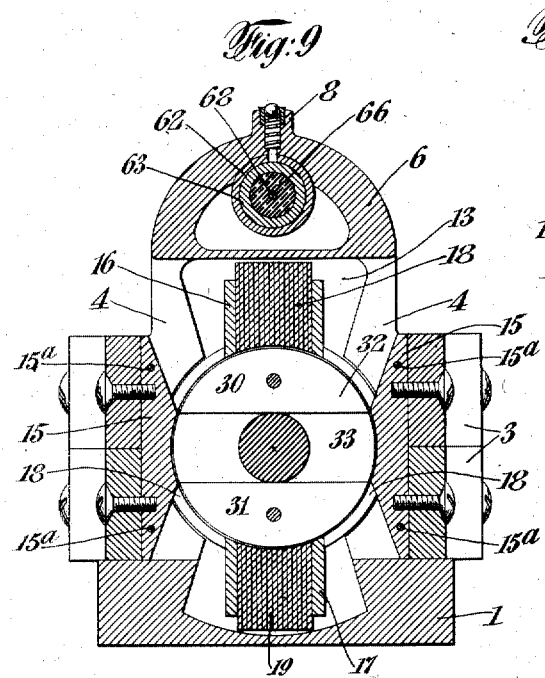

Fig. 9 represents a vertical transverse section on the line 9—9 of Fig. 5.

Figure 10:
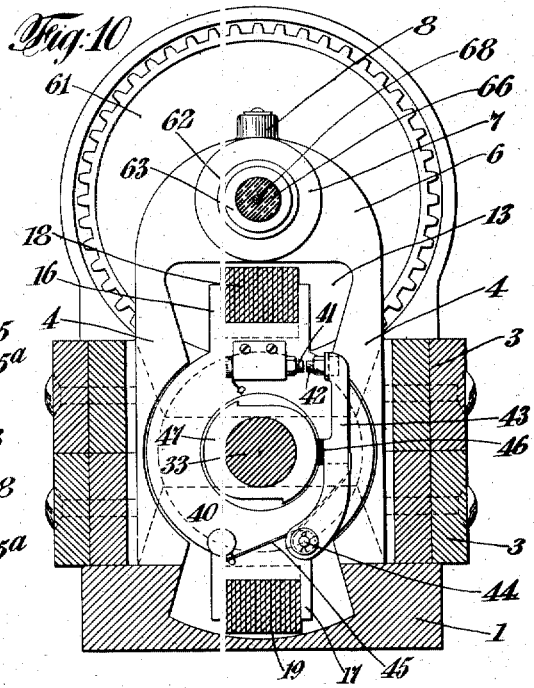
Figures 12, 13, 14, 15:
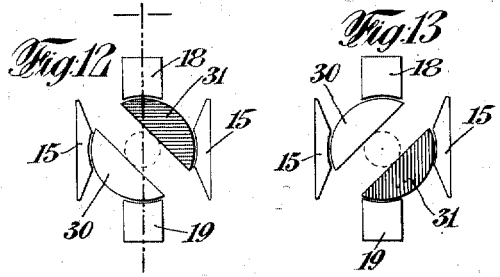

Fig. 10 represents a similar section on the line 10—10 of Fig. 5, looking in the direction of the arrows.

Figure 11:
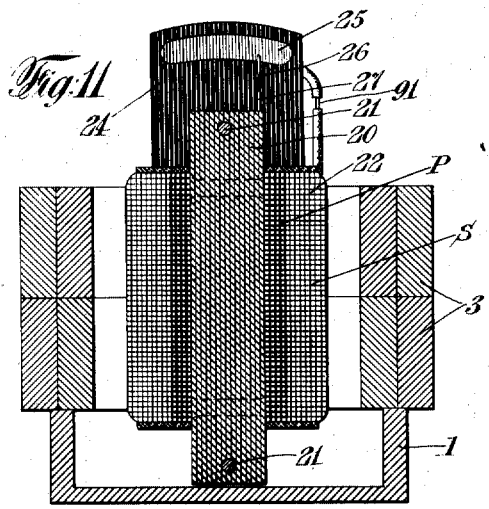

Fig. 11 represents a similar section on the line 11—11 of Fig. 5, looking in the direction of the arrows.

Figs. 12, 13, 14 and 15 are small diagrammatic views illustrating four positions of the rotary magnetic reversing device with respect to the stationary magnet pole shoes, and the normally stationary pole portions of the core, and illustrating the manner in which the magnetic flux is reversed through the separated sections of the rotary reversing device, and through the core.

Figure 16:
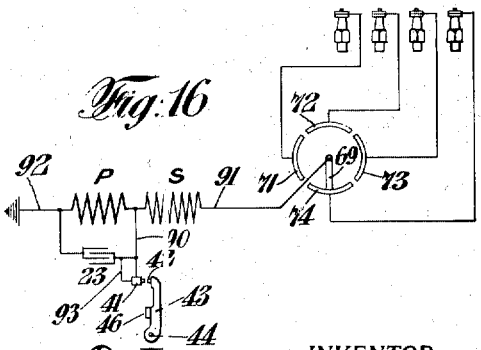

Fig. 16 is a circuit diagram.

The object of my invention is to improve and simplify the construction of magneto electric machines so as to greatly reduce the cost of manufacture of such, and at the same time to eliminate the disadvantages found in the construction and operation of those magneto electric machines in which an armature provided with a generating coil is rotated in the magnetic field.

According to my invention, I provide a field magnet or magnets having stationary pole shoes, a normally stationary core having parallel pole portions disposed parallel to an axial line extending between the magnet pole shoes, a coil, preferably comprising a primary winding and secondary winding surrounding portions of said core, and a rotary magnetic reversing device provided with separated portions of magnetic material, having its axis of rotation coincident with the axial line before referred to, and preferably parallel to the limbs of the field magnet or magnets, whereby the magnet pole shoes and the pole portions of the core will be arranged concentrically around the axis of the rotary device, so that as said device rotates the direction of magnetic flux will be reversed through the said separated portions of the rotary device and through the core, resulting in the generation of electric impulses first in one direction and then in the other in the generating coil.

The core structure together with the coil is so mounted that it may be oscillated about the axis of the rotary device so as to cause the pole portions to move laterally in curved paths concentric with said axis, for the purpose of advancing or retarding the spark without varying the intensity thereof. My invention also comprises other novel features of construction and combination of parts which are hereinafter fully disclosed and particularly pointed out in the claims.

In the accompanying drawings I have shown an embodiment of my invention selected by me for purposes of illustration, the same being a high tension magneto, which is adapted particularly for ignition purposes in connection with internal combustion engines such as are used in automobiles and other motor vehicles.

In Fig. 6 I have illustrated the main frame of the magneto which is preferably formed in one piece, although this is not necessary. As shown, this frame comprises a base plate, 1, provided with a longitudinally extending recess, 2, in its upper face, the base plate having the general form of the U-shaped or horse-shoe field magnet or magnets, 3, which are supported horizontally upon the marginal portions of the base plate indicated at 3ª in Fig. 6. The base plate, 1, is provided with means for supporting the oscillatable core structure in such a manner that it may be rocked about a horizontal axis extending between and parallel to the limbs of the field magnets. In this instance, the base plate is provided with four vertically disposed standards or supports, 4, arranged in pairs on opposite sides of the recess, 2, and preferably formed integrally with the base plate, the said standards having their inner faces curved, as indicated at 5, concentrically to the axis of oscillation of the core structure, which is coincident with the axis of rotation of the rotatable reversing device as hereinafter more fully explained.

The upper portions of the standards, 4—4 are united by a cap structure, 6, carrying a horizontally disposed bearing, 7, provided with an oiling device, 8, all of said parts being formed integrally with the base plate, 1, which is my preferred construction although they may be formed separately and secured together if desired. The base portion, 1, is also provided with a vertically disposed bridge piece, 9, provided with a central recess, 10, concentric with the longitudinal axis of rotation of the rotary reversing device, and adapted to receive the ball bearing, 11, or other bearing which supports the inner end of the shaft of said rotary device, as shown, for example, in Fig. 5, the said bridge piece being provided with an oiling device, 12, for said bearing located at one side of the same for convenience of access. The said bridge piece, 9, is preferably also formed integrally with the base plate, 1, thus enabling the entire frame structure to be cast in one piece of suitable material, preferably non-magnetic metal. The upper part of the frame above the curved portions, 5—5, is recessed as indicated at 13 to provide a space corresponding to the recess, 2, below said curved portions to permit the lateral movements of the pole portions of the core.

The field magnets, 3—3, are supported in horizontal position upon the marginal portions, 3ª, of the base plate and engage the outer faces of the standards and the bridge piece, 9, and the magnets, two pairs of which are shown, secured to each other and to the main frame by screws as shown, or in any other desired manner, and are provided with stationary pole shoes, 15, the inner faces of which are curved concentrically with the axis of the rotary device. These pole shoes, which lie between the standards, 4—4, of the main frame, are preferably secured to the standards 4—4 by dowel pins, 15ª, and the ends of the magnets are secured to the outer faces of the pole shoes.

In Fig. 7, I have shown in detail the unitary core and coil structure and the cradle or mounting by means of which it is held in the main frame, so as to be capable of oscillation. The supporting cradle for the core structure comprises upper and lower channeled portions, 16—17, connected by curved arms, 18—18, the exterior faces of which are curved so as to engage with a bearing fit, the curved faces, 5—5, of the standards, 4—4, thus permitting the cradle to be rocked with respect to said standards. Secured in the channeled portions, 16—17, of the cradle are the pole portions of the core which are preferably formed of laminations of magnetic material such as soft iron indicated at 18—19, the upper ends of which are connected to a transverse core portion, 20, in this instance by screws, 21, so as to form a rigid structure with the cradle. The transverse section, 20, of the core is provided with a generating coil, 22, comprising a primary winding, indicated at P in the circuit diagram, and secondary winding, indicated at S in the circuit diagram. 23 indicates a condenser which is preferably secured to and carried by the coil or otherwise supported on the core structure.

The upper end of the transverse portion, 20, of the core structure is provided with a block, 24, of insulating material provided with a segmental shaped contact plate, 25, which is connected with the secondary winding of the generating coil, in any suitable manner as by a wire, 91, said plate being curved concentrically with the axis of oscillation of the cradle. I also prefer to provide this segment, 25, with a contact point, 26, and to provide an adjacent portion of the core with a similar contact, 27, forming a safety spark gap for the magneto, as clearly shown in the drawings, (see particularly Figs. 1, 5 and 7). The cradle is bored out internally so as to receive within it the rotary magnetic reversing device which is illustrated in detail in Fig. 8 and it rotates freely within the cradle, between the pole portions, 18—19, of the core structure and between the armature pole shoes, 15—15, which lie between the curved portions, 18—18, of the cradle.

It will be understood that in assembling the parts the parallel portions, 18—19, of the core structure extend over and under respectively the bridge piece, 9, as clearly shown in Fig. 5. The rotary reversing device comprises two separated sections, 30—31, of magnetic material, preferably in the form of laminations of soft iron disposed transversely with respect to the axis of rotation and held or clamped between heads, 32, of non-magnetic material which are supported on the shaft, 33. The inner end of the shaft, 33, is mounted in the bearing, 11, before described, which is held in the bridge piece, 9, and the outer end of the shaft, 33, is supported in a bearing, 34, contained in a suitable housing, 35, forming part of the front plate, 36, which is secured to the base plate, 1, by screws, 37, or otherwise. The outer end of the shaft, 33, is provided with suitable means for attaching a driving member, as for example, the tapered portion, 38, and exterior threaded portion, 39, or which may be of any other usual or preferred construction.

I provide also a periodic interrupter for the primary circuit which is conveniently located adjacent to the inner end of the rotary induction device, and in this instance, I have shown the inner end of the cradle provided with an inwardly extending flange, 40 (see Figs. 5 and 10) which carries a fixed contact, 41, insulated therefrom, and a movable contact, 42, the latter being located on a spring actuated arm, 43, pivotally mounted on the flange, 40, at 44 and provided with a spring, 45, and a fiber heel, 46, which is adapted to engage a cam, 47, on the shaft, 33, of the rotary device, said cam being provided with means for making and breaking the circuit through the primary coil twice or any number of times in each revolution of the shaft, 33. It will thus be seen that by rocking the core structure and its cradle in one direction or the other the spark can be advanced or retarded and by reason of the construction and operation of the magneto the intensity of the spark will be substantially the same in all positions of advance or retard.

I have shown one means of rocking the core structure which comprises a timing lever, 48, (see Figs. 1, 2 and 5) which, in this instance, has its inner end secured to a slip band, 49, lying in a groove in the housing, 35, which is concentric with the shaft, 33, and forms a pivotal support for the timing lever, said band being provided with a depending lug, 50, engaging a pin, 51, secured to the cradle of the core structure and extending through a segmental slot, 52, in the front plate, 36, so as to permit the lateral movement of the pin, 51. It will be seen that by means of the timing lever, 48, the core structure can be rocked so as to move the pole portions thereof laterally in either direction in a curved path concentric with the longitudinal axis of the shaft, 33, and rotary device, and this will simultaneously rock the flange, 40, carrying the pivoted lever of the periodic interrupter so as to change its position with respect to the cam, 47, and effect the advance and retard of the spark.

The magneto herein shown is provided with means for collecting the secondary current and a distributer for distributing it to a plurality of spark plugs, for example, the four spark plugs of a four cylinder internal combustion engine, with which this magneto is especially adapted to be used, although obviously the distributing mechanism may be varied in a well known way to distribute current to a greater or lesser number of spark plugs, as circumstances may require.

The shaft, 33, is provided with a driving pinion, 60, meshing with a gear wheel, 61, of twice the diameter of the pinion mounted to rotate in the bearing, 7, at the upper part of the main frame of the machine. I prefer to provide the bearing, 7, with a bushing, 62, and to provide the gear, 61, with an integral bearing sleeve, 63, extending through said bushing. The gear, 61, is provided on its outer face with a block, 64, of insulating material, preferably in the form of a disk, which is connected therewith by an eccentrically located pin, 65, for example, or in any other suitable manner, the said block or disk being preferably provided with a sleeve, 66, of insulating material which extends through the supporting sleeve, 63, of the gear wheel, 61, and projects rearwardly therefrom, the rear end of said insulating sleeve, 66, being provided with a spring actuating brush, 67, which engages the segmental contact, 25, and maintains contact therewith in all positions to which the core structure may be moved. The brush, 67, is connected by means of a rod or wire, 68, with a brush, 69, extending laterally from the block, 64, and being constructed to engage in succession four segmental contacts, 71, 72, 73 and 74, arranged around the inner wall of a recess in a cap, 70, secured to the front plate, 36, of the machine by means of spring arms, 75, or by any other means which will permit the ready removal and replacement of said cap, the said cap being provided with four binding posts, 71ª, 72ª, 73ª and 74ª each connected with one of said segmentals.

From these binding posts, wires lead to the several spark plugs, the ground connection therefor being through the engine in the usual manner, and as indicated in the wiring diagram. The front plate, 36, is provided at its upper part with portions surrounding the gear, 61, to which the springs, 75, are secured and in order to protect the apparatus from dust and moisture, I preferably provide an inclosing casing indicated at 80 (Figs. 1 and 2) which is supported by the upper part of the front plate, and by the magnets, 3, as shown. The magnets themselves serve as a casing for the lower part of the apparatus, although the casing might be made to extend over said magnets, if desired.

It will be understood that there is a very minute air gap between the pole shoes and the exterior surface of the laminations of the rotary reversing device, and an equal air gap between the pole portions of the core structure and the rotary reversing device. In Figs. 12, 13, 14 and 15, I have shown diagrammatically the pole shoes and the pole portions of the core structure in assembled relation with the rotary reversing device and have illustrated the latter in four different positions, which will clearly illustrate the manner in which the direction of magnetic flux is alternately reversed through the separated portions, 30—31, of the rotary reversing device, and through the core structure so as to generate alternating current impulses in the primary winding which are interrupted by the periodic interrupter thereby inducing high tension current in the secondary winding, which is distributed to the spark plugs, in the manner before described.

In Figs. 12 to 15 I have shaded the representation of one of the magnetic portions, 30, of the rotary magnetic reversing device in order to more clearly illustrate the different positions of the device in its revolution.

Fig. 16 illustrates a circuit diagram in which P represents the primary winding, S the secondary winding, the primary winding being connected by a wire, 90, to the condenser, 23, and by a branch wire, 93, from the condenser to the contact, 41, of the periodic interrupter, the movable contact, 42, thereof being connected to ground. The condenser is connected by a wire, 92, to the grounded end of the primary winding. The secondary winding is connected to the distributer brush, 69, by which the secondary or high tension current is distributed to the segments, 71, 72, 73, and 74, which are in turn connected with the spark plugs indicated at 101, 102, 103 and 104 in the diagram.

It will be apparent from the foregoing description that my improved magneto is very simple in construction, that the parts can be readily formed and assembled with a minimum amount of skilled labor, and that the apparatus is strong and durable, and can be readily kept in repair. It will also be noted that the contacts of the periodic interrupter are located in such a manner that their meeting faces are vertically disposed and the contacts are supported above the shaft, 33, and sufficiently to one side of a vertical line passing through the axis of said shaft so that they are not beneath the upper core portion, 18, thus making them readily accessible from above for the purpose of adjustment or for cleaning by means of a file or otherwise. It will thus be seen that by simply removing the hood or casing, 80, the contacts are immediately and conveniently accessible for these purposes without the necessity of disturbing any other part of the magneto, which is of great convenience in an apparatus of this character.

What I claim and desire to secure by Letters Patent is:

1. In a magneto electric machine the combination with a field magnet having stationary pole shoes, of a core provided with parallel opposed pole portions interposed between the magnet pole shoes, a coil surrounding portions of said core, said pole shoes and pole portions being disposed concentrically around a common axial line and a rotary magnetic reversing device having its axis of rotation coincident with said axial line located between said pole shoes and pole portions and provided with separated portions of magnetic material for reversing the direction of magnetic flux through said separated portions of the rotary device and through said core, the pole portions of said core being movable laterally in curved paths concentric with said axial line.

2. In a magneto electric machine the combination with a permanent field magnet having parallel limbs provided with stationary pole shoes, said pole shoes having curved inner faces concentric with an axial line parallel with and between the limbs of the field magnet, of a rotary magnetic reversing device arranged between said pole shoes and having its axis of rotation coincident with said axial line, a normally stationary core having parallel portions extending on opposite sides of said rotary device and parallel with the axis thereof, a coil surrounding portions of said core, said core and coil being pivotally mounted concentrically with said axial line whereby the pole portions of said core may be moved laterally in curved paths concentric with said axial line.

3. In a magneto electric machine the combination with a field magnet having parallel limbs provided with stationary pole shoes, of a rotary magnetic reversing device having its axis of rotation disposed centrally between said pole shoes and extending parallel with the limbs of the field magnets, a normally stationary core having parallel pole portions disposed parallel to and on opposite sides of the axis of said rotary reversing device, and a transversely disposed portion connecting said parallel pole portions and lying between the limbs of the field magnet and disposed transversely thereof, and a coil surrounding portions of said core, pivotal supporting means for said core and coil, concentric with the axis of rotation of said rotary reversing device, and means for rocking said core and coil so as to move the pole portions of the core laterally in curved paths concentric with said axis, said rotary device being provided with separated portions of magnetic material.

4. In a magneto electric machine the combination with field magnets provided with horizontally disposed parallel portions, stationary pole shoes secured to said parallel portions of the magnets and having their inner faces curved concentrically with an axial line parallel with and located between the parallel portions of the magnets, a rotary magnetic reversing device arranged between said pole shoes and having its axis of rotation coincident with said axial line, a normally stationary core structure having parallel portions on opposite sides of the rotary device and parallel with the axis thereof, a coil surrounding portions of said core and comprising a primary winding and a secondary winding, pivotal supporting means for said core structure and coil concentric with the axis of rotation of said rotary device, a periodic interrupter electrically connected with the primary winding, a distributer, a stationarily supported collecting brush connected with said distributer, and a segmental contact carried by said core structure and curved concentrically with the pivotal axis thereof, and engaging said brush and means for rocking said core structure and coil upon its pivotal supporting means.

5. In a magneto electric machine the combination with a main frame provided with separated supporting devices having opposed curved portions concentric with a common axis, a field magnet having parallel portions located on opposite sides of and parallel with said axis, stationary pole shoes secured to said parallel portions of the magnet adjacent to said supports, a core structure provided with parallel pole portions disposed on opposite sides of and parallel to said axis, supporting means for said core structure having exterior curved surfaces concentric with and engaging the curved surfaces of said supports, a coil surrounding portions of said core structure, and a rotary magnetic reversing device located within said supporting means provided with separated portions of magnetic material, said rotary device being located between the pole portions of said core and the pole shoes of said magnet.

6. In a magneto electric machine the combination with the main frame provided with vertically disposed supports provided with opposite curved portions concentric with a common axis, said frame having recessed portions above and below said curved portions, of a core structure comprising parallel pole portions extending through said recessed portions on opposite sides of said axis and parallel thereto, a coil surrounding portions of said core, a cradle having portions secured to the pole portions of the core and curved connecting portions having exterior bearing surfaces engaging the curved portions of said supports, a rotary magnetic reversing device mounted within said cradle and having its axis concentric with the curved portions of said supports, said rotary device being provided with separated portions of magnetic material, and a field magnet having parallel portions on opposite sides of said supports, and parallel to the axis of said rotary device, and pole shoes connected with the parallel portions of said magneto and lying on opposite sides of said rotary device.

In testimony whereof I affix my signature.

FRANCIS R. HOYT.